United States Patent
Jang et al.

(10) Patent No.: US 9,487,104 B2
(45) Date of Patent: Nov. 8, 2016

(54) METHOD AND APPARATUS FOR CONTROLLING AN ELECTRICALLY-POWERED TORQUE MACHINE OF A POWERTRAIN SYSTEM

(71) Applicant: GM GLOBAL TECHNOLOGY OPERATIONS LLC, Detroit, MI (US)

(72) Inventors: Jihoon Jang, Torrance, CA (US); Sean W. McGrogan, Ann Arbor, MI (US); William R. Cawthorne, Milford, MI (US); Krunal P. Patel, Sterling Heights, MI (US); Bon Ho Bae, Torrance, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 150 days.

(21) Appl. No.: 14/093,681

(22) Filed: Dec. 2, 2013

(65) Prior Publication Data
US 2015/0155812 A1 Jun. 4, 2015

(51) Int. Cl.
*H02P 23/14* (2006.01)
*B60L 15/20* (2006.01)
*B60W 20/00* (2016.01)
*B60L 11/14* (2006.01)

(52) U.S. Cl.
CPC .............. *B60L 15/20* (2013.01); *B60L 11/14* (2013.01); *B60W 20/00* (2013.01); *B60W 20/40* (2013.01); *B60L 2240/12* (2013.01); *B60L 2240/421* (2013.01); *B60L 2240/423* (2013.01); *B60L 2240/441* (2013.01); *B60L 2240/443* (2013.01); *H02P 23/14* (2013.01); *Y02T 10/645* (2013.01); *Y02T 10/70* (2013.01); *Y02T 10/7077* (2013.01); *Y02T 10/72* (2013.01); *Y02T 10/7275* (2013.01); *Y10S 903/903* (2013.01)

(58) Field of Classification Search
CPC ...... H02P 23/004; B60L 15/20; B60W 20/00
See application file for complete search history.

(56) References Cited

U.S. PATENT DOCUMENTS

| | | | |
|---|---|---|---|
| 6,239,575 B1* | 5/2001 | Xu | B60L 15/025 318/599 |
| 7,090,613 B2* | 8/2006 | Heap et al. | 477/3 |
| 7,225,782 B2* | 6/2007 | Pallett et al. | 123/192.1 |
| 8,099,204 B2* | 1/2012 | Snyder et al. | 701/22 |
| 8,261,864 B2* | 9/2012 | Bhattarai et al. | 180/65.285 |
| 2011/0130903 A1* | 6/2011 | Heisel et al. | 701/22 |

OTHER PUBLICATIONS

Doncker, R.W., The Universal Field Oriented Controller, IEEE Transactions on Industry Applications, vol. 30, No. 1, Jan./Feb. 1994.

* cited by examiner

*Primary Examiner* — Todd Melton (57) ABSTRACT

A method for controlling an electrically-powered torque machine of a powertrain system includes determining a predicted torque command to control the torque machine. A flux command is determined responsive to the predicted torque command. The flux command is a flux level providing a fast torque reserve that is responsive to the predicted torque command. The fast torque reserve is a prescribed minimum rate of change in torque output from the torque machine responsive to the predicted torque command. An inverter controller controls flux of the torque machine responsive to the flux command.

18 Claims, 5 Drawing Sheets

METHOD AND APPARATUS FOR CONTROLLING AN ELECTRICALLY-POWERED TORQUE MACHINE OF A POWERTRAIN SYSTEM

TECHNICAL FIELD

This disclosure is related to electrically-powered torque machines, and control thereof.

BACKGROUND

The statements in this section merely provide background information related to the present disclosure. Accordingly, such statements are not intended to constitute an admission of prior art.

Electrically-powered torque machines in the form of multi-phase electric induction motors are employed on powertrain systems to generate propulsion torque as a replacement for or in conjunction with an internal combustion engine. Control of multi-phase, e.g., three-phase electric induction motors can include employing direct (d)-quadrature (q) transformations (abc-dq) to simplify analysis of multi-phase circuits for the motors. This permits reducing three alternating current (AC) quantities to two direct current (DC) quantities for ease of calculations and associated control in the dq reference frame. A stator motor current space vector can be defined in the dq reference frame with orthogonal components along the direct and quadrature axes such that a field flux linkage is aligned along the d-axis and a torque component is aligned along the q-axis. After execution of calculations, an inverse transformation (dq-abc) occurs to determine control commands for operating the motor that can be executed in an inverter. Flux commands are used to determine a direct-current (Id) portion of control in the dq reference frame and torque commands correspond to the quadrature-current (Iq) portion of control in the dq reference frame.

SUMMARY

A method for controlling an electrically-powered torque machine of a powertrain system includes determining a predicted torque command to control the torque machine. A flux command is determined responsive to the predicted torque command. The flux command is a flux level providing a fast torque reserve that is responsive to the predicted torque command. The fast torque reserve is a prescribed minimum rate of change in torque output from the torque machine responsive to the predicted torque command. An inverter controller controls flux of the torque machine responsive to the flux command.

BRIEF DESCRIPTION OF THE DRAWINGS

One or more embodiments will now be described, by way of example, with reference to the accompanying drawings, in which:

FIG. 4-1 illustrates a three-dimensional plot of data associated with an achievable rate of change in torque in relation to a magnitude of output torque and flux for an embodiment of an electrically-powered torque machine, in accordance with the disclosure;

FIG. 4-2 illustrates a two-dimensional plot of data that is derived from the data of FIG. 4-1, including a selected magnitude of achievable rate of change in torque shown in relation to achievable rates of change in torque and a magnitude of output torque of the torque machine, in accordance with the disclosure;

FIG. 6-1 illustrates torque machine torque and flux associated with a first operating point of an embodiment of a torque machine in relation to time, in accordance with the disclosure; and FIG. 6-2 illustrates torque machine torque and flux associated with a second operating point of an embodiment of a torque machine in relation to time, in accordance with the disclosure.

DETAILED DESCRIPTION

Figure 1:
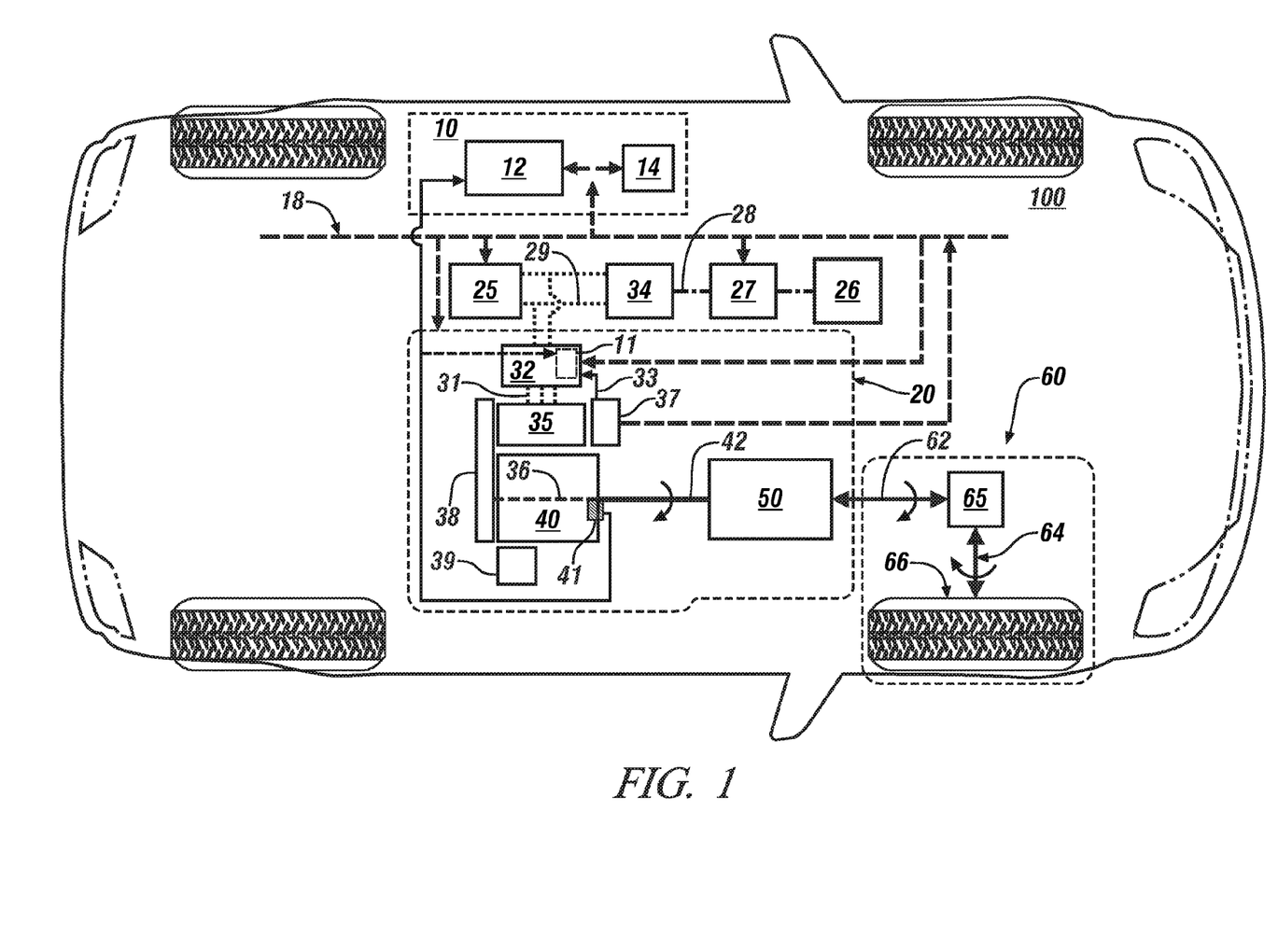
FIG. 1 illustrates a vehicle including a powertrain system coupled to a driveline and including an internal combustion engine, transmission, and an electrically-powered torque machine, in accordance with the disclosure.

Referring now to the drawings, wherein the showings are for the purpose of illustrating certain exemplary embodiments only and not for the purpose of limiting the same, FIG. 1 schematically shows a vehicle 100 including a powertrain system 20 coupled to a driveline 60 and controlled by a control system 10. Like numerals refer to like elements throughout the description. The powertrain system 20 includes an internal combustion engine 40, a transmission 50, and an electrically-powered torque machine 35. The internal combustion engine 40 includes a crankshaft 36 that mechanically rotatably couples to the transmission 50 via an input member 42 and mechanically rotatably couples to the torque machine 35 via a pulley mechanism 38.

The electrically-powered torque machine 35 and the internal combustion engine 40 are torque-generating devices. In one embodiment, the electrically-powered torque machine 35 includes an output member that mechanically rotatably couples to the crankshaft 36 of the engine 40 via the pulley mechanism 38, thus providing a mechanical power path therebetween. The pulley mechanism 38 is configured to effect torque transfer between the engine 40 and the torque machine 35, including transferring torque from the torque machine 35 to the engine 40 for engine autostart and autostop maneuvers, tractive torque assistance, regeneratively braking the vehicle, and transferring torque from engine 40 to the torque machine 35 for high-voltage electrical charging. In one embodiment, the pulley mechanism 38 includes a serpentine belt routed between the pulley attached to the crankshaft 36 of the engine 40 and another pulley attached to a rotating shaft coupled to a rotor of the torque machine 35, referred to as a belt-alternator-starter (BAS) system. The pulley mechanism 38 is configured with a known pulley ratio K, which defines a ratio between a single rotation of the engine 40 and a quantity of rotations of the torque machine 35. Alternatively, the pulley mechanism 38 may include a positive-displacement gearing mechanism. The engine 40 may include a low-voltage solenoid-actuated electrical starter 39 for starting in response to a key-crank event in one embodiment. Other configurations of the electrically-powered torque machine 35, the internal combustion engine 40 and the transmission 50 may be employed without limitation.

The engine 40 is preferably a multi-cylinder internal combustion engine that converts fuel to mechanical torque through a four-cycle thermodynamic combustion process that preferably includes repetitive execution of intake, compression, combustion and exhaust cycles over 720° of engine rotation, i.e., two complete engine revolutions. The engine 40 is equipped with a plurality of actuators and sensing devices for monitoring operation and delivering fuel to form a combustion charge to produce torque that is responsive to an operator torque request. The sensing devices include a crankshaft position sensor 41 for monitoring engine crank angle, which can be employed in monitoring engine position. The engine 40 is configured to execute autostart and autostop control schemes and fuel cutoff (FCO) control schemes during ongoing operation of the powertrain system 20. The engine 40 is considered to be in an OFF state when it is not rotating. The engine 40 is considered to be in an ON state when it is rotating, including one or more FCO states in which the engine is spinning and unfueled.

The torque machine 35 is preferably an induction motor configured as a high-voltage multi-phase electric motor/generator that converts stored electric energy to mechanical power and converts mechanical power to electric energy that may be stored in a high-voltage battery 25. The torque machine 35 includes a rotor and a stator and an accompanying position sensor 37, which is a variable reluctance resolver in one embodiment. The resolver 37 signally connects directly to an inverter controller 11 via harness 33 and is employed to monitor rotational position of the rotor of the torque machine 35. The rotational position of the rotor of the torque machine 35 is employed by the inverter controller 11 to control operation of an inverter module 32 that controls the torque machine 35. The inverter controller 11 is preferably co-located with the inverter module 32 (as shown) or, alternatively, may be remotely located, e.g., within control module 12.

A high-voltage battery 25 electrically connects to the inverter module 32 via a high-voltage DC bus 29 to transfer high-voltage DC electric power to the torque machine 35 in response to control signals originating in the control system 10. The inverter module 32 electrically connects to the torque machine 35 via a multi-phase motor control power bus 31, with electric current preferably monitored on two or three of the leads thereof. The inverter module 32 is configured with suitable control circuits including paired power transistors, e.g., IGBTs for transforming high-voltage DC electric power to high-voltage AC electric power and transforming high-voltage AC electric power to high-voltage DC electric power. The inverter module 32 preferably employs pulsewidth-modulating (PWM) control to convert stored DC electric power originating in the high-voltage battery 25 to AC electric power to drive the torque machine 35 to generate torque. Similarly, the inverter module 32 converts mechanical power transferred to the torque machine 35 to DC electric power to generate electric energy that is storable in the high-voltage battery 25, including as part of a regenerative control strategy. It is appreciated that the inverter module 32 is configured to receive motor control commands and control inverter states to provide the motor drive and regeneration functionality. In one embodiment, a DC/DC electric power converter 34 electrically connects to a low-voltage bus 28 and a low-voltage battery 27, and electrically connects to the high-voltage bus 29. Such electric power connections are known and not described in detail. The low-voltage battery 27 electrically connects to an auxiliary power system 26 to provide low-voltage electric power to low-voltage systems on the vehicle, including, e.g., electric windows, HVAC fans, seats, and the low-voltage solenoid-actuated electrical starter 39.

The transmission 50 preferably employs one or a plurality of differential gear sets and hydraulically-activated clutches to effect torque transfer in one of a plurality of selectable operating modes over a range of speed ratios between the engine 40 and an output member 62. The transmission 50 includes any suitable configuration, and can be an automatic transmission that is configured to automatically shift between a plurality of selectable fixed-gear operating modes to operate at a gear ratio that achieves a preferred match between an operator torque request and an engine operating point. The driveline 60 may include a differential gear device 65 that mechanically couples to an axle 64 or half-shaft that mechanically couples to a wheel 66 in one embodiment. The driveline 60 transfers tractive power between the transmission 50 and a road surface.

The control system 10 includes control module 12 that signally connects to an operator interface 14. The control module 12 can be a unitary control module that is centrally located to provide operational control of the individual elements of the powertrain system 20, or a plurality of discrete control modules that are co-located with the individual elements of the powertrain system 20 to effect operational control thereof, or some other suitable combination of control modules. The control system 10 may also include hierarchical control of the control modules. The control module 12 preferably signally and operatively connects to individual elements of the powertrain system 20 either directly or via communications bus 18. The control module 12 signally connects to the sensing devices of each of the high-voltage battery 25, the inverter module 32, the torque machine 35, the engine 40, and the transmission 50 to monitor operation and determine parametric states thereof. The operator interface 14 of the vehicle 100 includes a plurality of human/machine interface devices through which the vehicle operator commands operation of the vehicle 100, including, e.g., an ignition switch to enable an operator to crank and start the engine 40, an accelerator pedal, a brake pedal, a transmission range selector (PRNDL), a steering wheel, and a headlamp switch.

The powertrain system 20 includes a communications scheme including the communications bus 18 to effect communications in the form of sensor signals and actuator command signals between the control system 10 and elements of the powertrain system 20. It is appreciated that the communications scheme effects information transfer to and from the control system 10 using one or more communications systems and devices, including, e.g., the communications bus 18, a direct connection, a local area network bus, a serial peripheral interface bus, and wireless communications.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 100 microseconds and 3.125, 6.25, 12.5, 25 and 100 milliseconds during ongoing operation. Alternatively, routines may be executed in response to occurrence of an event.

The control module 12 includes control routines that monitor operation of elements of the powertrain system 20 and operator commands input from the operator interface 14 and determines commands for operating the powertrain system 20 that are responsive to the operator command. The commands for operating the powertrain system 20 include torque commands for the torque machine 35, which are communicated to the inverter controller 11 for implementation as described with reference to FIGS. 2 and 3 and include an immediate torque command and a predicted torque command.

Figure 41:
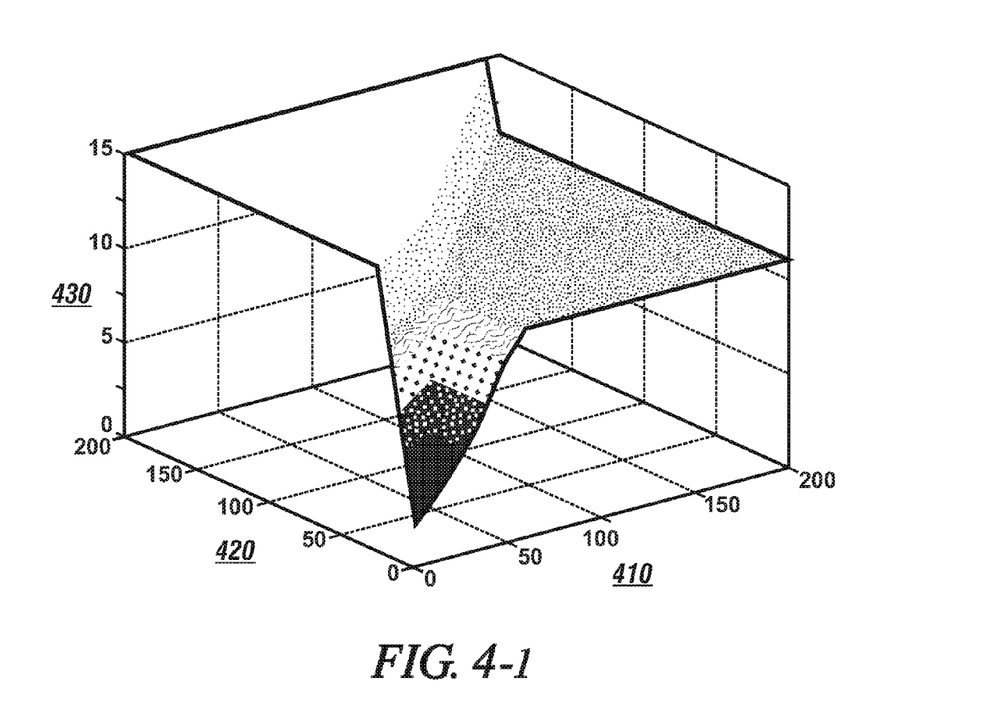
Figure 42:
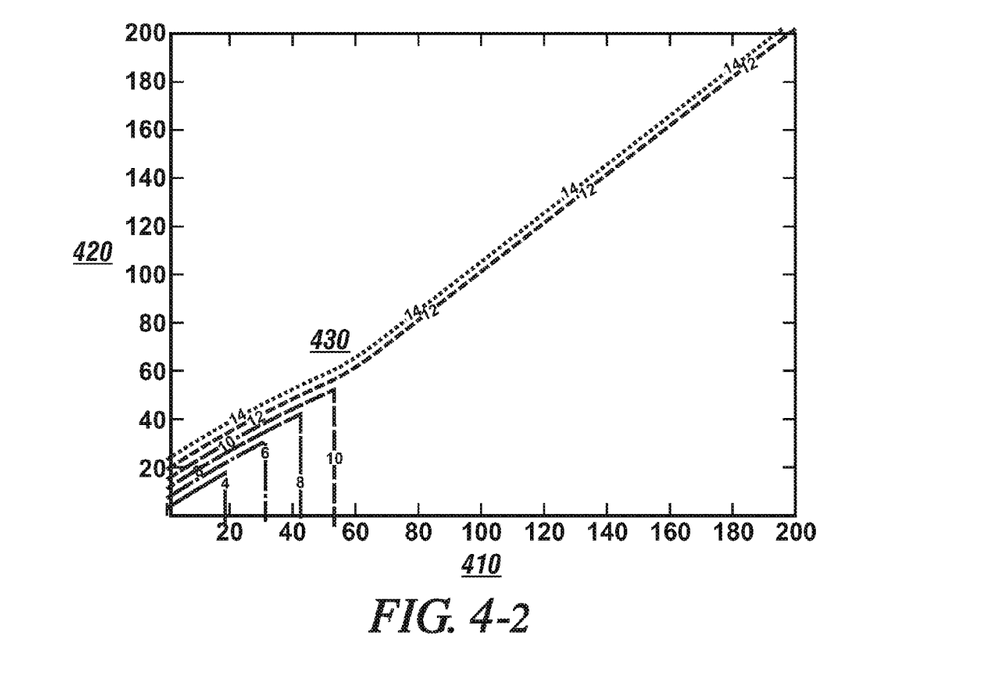

The immediate torque command is a command for motor torque that is immediately responsive to system operation, i.e., the torque that shall be produced by the torque machine as quickly as it can be produced by the torque machine. The predicted torque command is a magnitude of torque the motor shall be able to produce within a specified time period. Thus, the predicted torque command is a magnitude of torque that the electric machine prepares to produce within a specified amount of time. In one embodiment, the operating parameter of interest with regard to the predicted torque command is defined as a rate of change in torque, and overall operation of the torque machine may be evaluated in terms of a torque response time. The rate of change in torque is a time-rate measurement of the capability of the torque machine to change, i.e., increase torque from a present magnitude of torque to a commanded magnitude of torque, and may be measured in units of kilonewton-meters per second (kN-m/s). A torque machine's capability to increase torque, i.e., the rate of change in torque relates to the present magnitude of output torque and flux in the electric machine as described with reference to FIG. 4. The torque machine is preferably controlled to be able to increase torque from the present or instantaneous torque to the predicted torque command at a prescribed minimum rate of change in torque, which includes controlling magnitude of flux in the torque machine. By way of example, the torque machine is controlled to produce a magnitude of flux that will achieve the prescribed minimum rate of change in torque of 10 kN-m/s in response to the predicted torque command.

Figure 5:
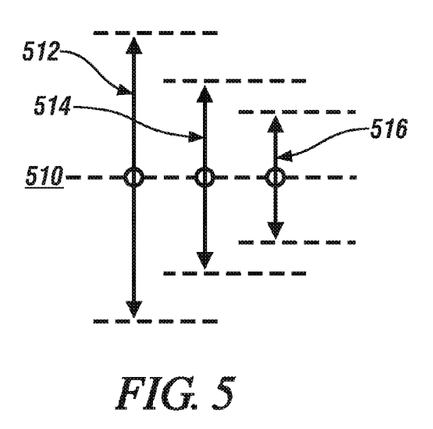
FIG. 5 illustrates elements associated with building a fast torque reserve for operating an embodiment of the torque machine with magnitude of torque shown in the vertical direction, in accordance with the disclosure.

The predicted torque command is employed to prepare the torque machine to be responsive to potential changes in the motor torque command that may occur in near-term operation. The predicted torque command is employed to overcome system and component latencies including response times, lag times associated with mechanical inertia, control signal delays, transient delays associated with response times of the high-voltage switches and other factors. The predicted torque command includes a determination of a commanded motor torque that may occur in the near-term, e.g., within 200 msec, and can include a projected change in motor torque responsive to pending changes in vehicle operations such as engine pulse cancellation during engine autostop and autostart operations, driveline damping related to gear lash, transmission input speed control during gear shifting, and other operations. FIG. 5 graphically shows such elements. Thus, the immediate torque command and the predicted torque command may be substantially the same value under steady-state conditions. The predicted torque command may deviate from the immediate torque command under operating conditions that indicate a pending change in vehicle operations requiring a change in system torque such as executing gear shifting or executing either an engine autostop or an engine autostart operation, depending upon the magnitude of the immediate torque command.

Figure 2:
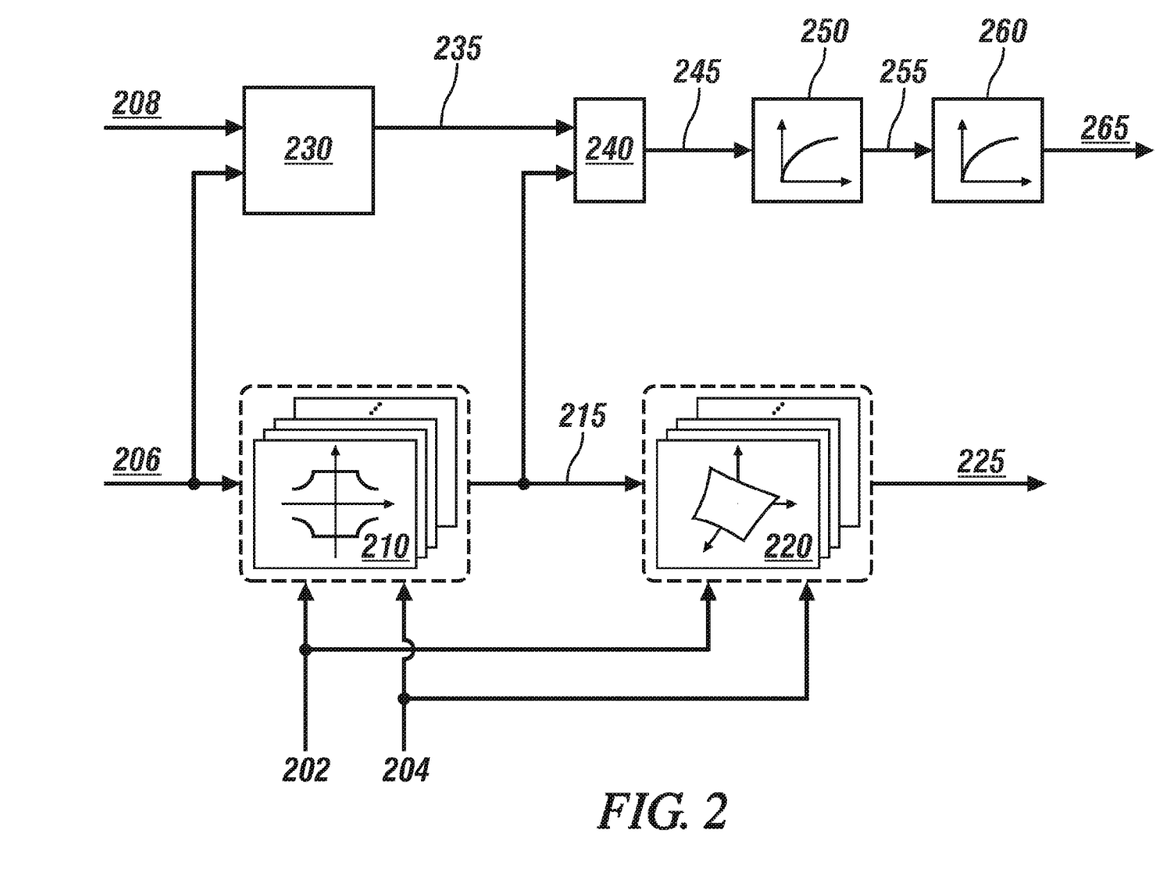
FIG. 2 illustrates an adaptive rotor flux command process for determining direct and quadrature current commands for operating the motor of FIG. 1, in accordance with the disclosure.

FIG. 2 schematically shows an adaptive rotor flux command process for determining direct and quadrature current commands for operating an embodiment of the motor 40 of FIG. 1 responsive to an immediate torque command 206 and a predicted torque command 208. The adaptive rotor flux command process can lead to increased system efficiency that includes a maximum torque response that compensates for a time delay between a commanded direct current and generation of rotor flux thus achieving an improved torque response with minimized system power loss. Monitored inputs include the motor rotational speed 202 and the high-voltage DC electrical potential 204. The immediate torque command 206 in combination with the motor rotational speed 202 and the high-voltage DC electrical potential 204 are employed by a torque command clamp 210, which determines a clamped torque command 215 based thereon. The clamped torque command 215 is based upon the capability of the motor 40 to respond to the immediate torque command 206 in view of the motor rotational speed 202 and the high-voltage DC electrical potential 204. Thus, the clamped torque command 215 is limited to the maximum achievable torque for the motor 40 at the motor rotational speed 202 for the high-voltage DC electrical potential 204.

The clamped torque command 215 in combination with the motor rotational speed 202 and the high-voltage DC electrical potential 204 are input to a quadrature current command determination scheme 220, which determines a magnitude for the quadrature current command (Iq) 225 responsive to the clamped torque command 215 and the motor rotational speed 202. The quadrature current command (Iq) 225 thus relates to the immediate torque command 206. Coincidently, the immediate torque command 206 in combination with the predicted torque command 208 are input to an adaptive predicted torque routine 230 to determine an adapted predicted torque command 235. An embodiment of the adapted predicted torque routine 230 is described with reference to FIG. 3. The adapted predicted torque command 235 is compared with the clamped torque command 215 in comparator 240, which selects the maximum thereof as a flux torque command 245. The flux torque command 245 is determined based upon the adapted predicted torque command 235, and is employed to determine a flux command 255 to control flux such that torque output from the torque machine is responsive to the prescribed minimum rate of change in torque as described with reference to FIG. 4. The flux command 255 is at a flux level that provides a fast torque reserve, which is a minimum flux value that can achieve the prescribed minimum rate of change in torque. Thus, the magnitude of flux in the torque machine can be controlled such that the torque machine is able to achieve a change in torque that is associated with a fast torque reserve at the prescribed minimum rate of change in torque, which is 10 kN-m/sec in one embodiment. The flux command determination scheme 250 determines a flux command 255 corresponding to the magnitude of the flux torque command 245. The flux command 255 is input to a direct current determination scheme 260, which determines a magnitude of direct current command Id 265 using the direct-quadrature mathematical transformation. As appreciated by one having ordinary skill in the art, there is a response time delay between the direct current command Id and generation of rotor flux causing torque. Thus, selecting the maximum of the adapted predicted torque command 235 and the clamped torque command 215 as the flux torque command 245 improves responsiveness in rotor flux generation. This achieves an improved torque response while minimizing system power loss by selecting a direct current command Id that provides a maximum achievable flux without burning power associated with added torque, thus providing a maximum torque response that compensates for a time delay between commanded direct current and generation of rotor flux. The direct current command Id 265 and the quadrature current command Iq 225 are subjected to an inverse transformation (dq-abc) to derive three-phase AC commands employed to control the inverter to achieve the torque command.

Figure 3:
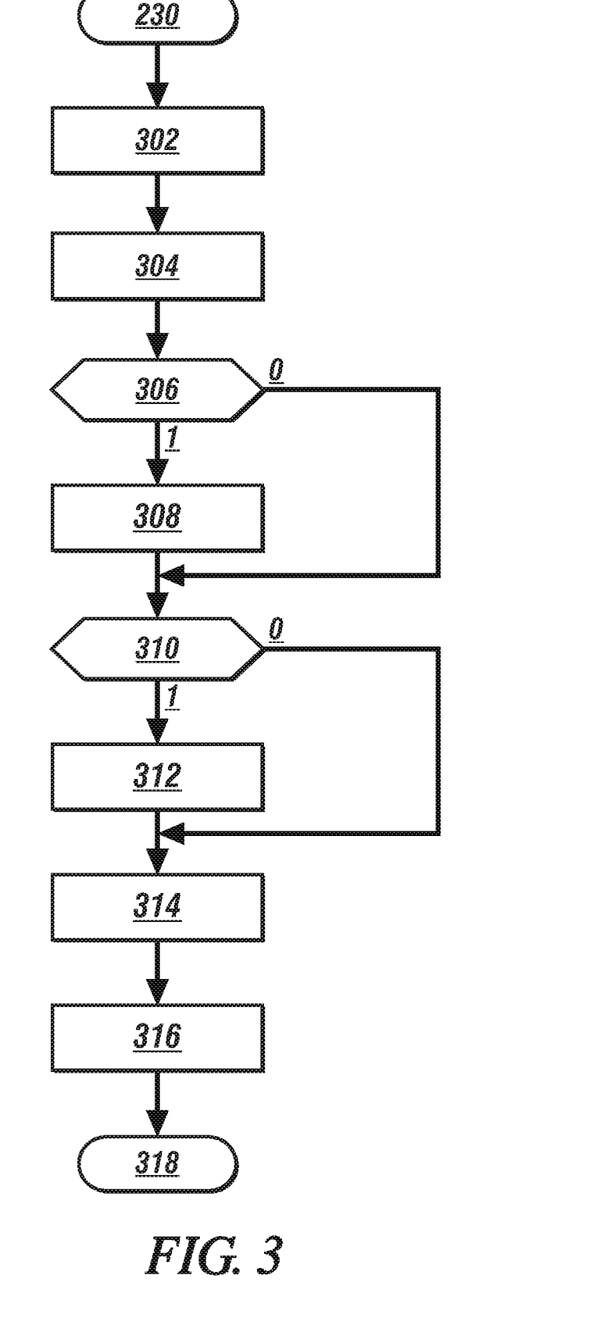
FIG. 3 illustrates an adaptive predicted torque routine employed to determine an adaptive predicted torque command employed in the adaptive rotor flux command process of FIG. 2, in accordance with the disclosure.

FIG. 3 schematically shows an embodiment of the adaptive predicted torque routine 230, employed to determine the adaptive predicted torque command 235 employed in the aforementioned adaptive rotor flux command process of FIG. 2 for determining direct and quadrature current commands for operating the motor 40 of FIG. 1. Table 1 is provided as a key to FIG. 3 wherein the numerically labeled blocks and the corresponding functions are set forth as follows.

TABLE 1

| BLOCK | BLOCK CONTENTS |
| --- | --- |
| 230 | Adaptive Predictive Torque Routine |
| 302 | Set Tabs = abs(Tcmd) |
| 304 | Set Δabs = Max[abs(Tprd) − Tabs, 0] |
| 306 | Is Δabs > Min(Δmax, Tmax) |
| 308 | Set Δabs = Min(Δmax, Tmax) |
| 310 | Is Tabs > Tmax? |
| 312 | Set Tabs = Tmax |
| 314 | Table Search Δpf = F(Tabs, Δabs) |
| 316 | Set Tpf = abs(Tcmd) + Δpf |
| 318 | Return |

Each execution of the adaptive predicted torque routine 230 operates as follows. An absolute value of the torque command Tabs, i.e., the immediate torque command 206 is identified (302), i.e., Tabs=abs(Tcmd). This operation eases calculation regardless of whether the torque command is positive, i.e., converting electric power to torque, or negative, i.e., converting torque to electric power. A torque difference term Δabs is set as the maximum of a difference between an absolute value of the predicted torque command Tprd and an absolute value of the torque command Tabs, and zero. Thus, when the absolute value of the torque command Tabs is greater than the predicted torque command Tprd, the torque difference term Δabs is set equal to zero (304). The torque difference term Δabs is compared to a minimum of a maximum allowable difference term Δmax and a maximum motor torque limit Tmax (306), and when greater (306)(1), the torque difference term Δabs is set equal to the minimum of the maximum allowable difference term Δmax and the maximum motor torque limit Tmax (308). Otherwise (306)(0), operation continues. This includes comparing the absolute value of the torque command Tabs with the maximum motor torque limit Tmax (310). When the absolute value of the torque command Tabs is greater than the maximum motor torque limit Tmax (310)(1), the absolute value of the torque command Tabs is set equal to the maximum motor torque limit Tmax (312). Otherwise (310)(0), operation continues, which includes determining an adapted value for the difference term Δpf in relation to both the absolute value of the torque command Tabs and the torque difference term Δabs (314). In one embodiment, the adapted value for the difference term Δpf can be determined in relation to both the absolute value of the torque command Tabs and the difference term Δabs employing a calibration table that is empirically developed based upon torque response. From the standpoint of system efficiency, a lower value of difference term Δpf is preferred because increasing the difference term Δpf causes an increase in the flux torque command, which will result in increased current with an accompanying increased power loss. Table 2 shows an exemplary calibration table developed for employment with an embodiment of the motor 40 of FIG. 1.

TABLE 2

| | | Tabs | | | |
| --- | --- | --- | --- | --- | --- |
| Δpf | | 0 | 20 | 40 | 60 |
| Δabs | 0 | 0 | 0 | 0 | 0 |
| | 20 | 14 | 11 | 5 | 0 |
| | 40 | 27 | 21 | 10 | 0 |
| | 60 | 39 | 31 | 20 | 0 |
| | 80 | 50 | 40 | 20 | 0 |
| | 100 | 60 | 40 | 20 | 0 |
| | 120 | 60 | 40 | 20 | 0 |

The values of the difference terms Δpf that populate the calibration table shown with reference to Table 2 can be derived as follows. A representative example of an embodiment of the motor 40 described in FIG. 1 can be configured to operate in a laboratory test cell under controlled operating and environmental conditions. Initially the torque command is set to a selected value for the absolute torque command Tabs, and the difference term Δpf is set equal to the torque difference term Δabs. The absolute torque command Tabs is increased by an amount equal to the torque difference term Δabs (Tabs+Δabs) and actual torque is measured along with a torque response time. The torque command is decreased to the absolute torque command Tabs. The difference term Δpf is decreased with the predetermined value (e.g., 10 Nm). The torque command is again increased (Tabs+Δabs) and the actual torque is again measured. The torque response time is again measured and compared with the previously determined torque response time. The foregoing steps are repeated until the torque response time of the actual torque to the torque command increases significantly, i.e., is greater than a predetermined requirement, and a value for the difference term Δpf is chosen that is a minimum value of the difference term Δpf that causes the torque rate of change to be greater than or equal to the prescribed minimum rate of change in torque. In this manner, the difference term Δpf is set to a minimum value that achieves the required torque response rate of change and coincidentally minimizes the flux. This process is repeated for each combination of the values of absolute torque command Tabs and the torque difference term Δabs over the ranges of values for the absolute torque command Tabs and the torque difference term Δabs. The adapted value for the difference term Δpf is determined in relation to both the absolute value of the torque command Tabs and the torque difference term Δabs.

A final predicted torque command Tpf, i.e., the adapted predicted torque command 235 of FIG. 2, is determined as a numerical sum of the absolute value of the torque command Tabs and the difference term Δpf (316), and this term is returned to the adaptive rotor flux command process 200 to be employed as the adapted predicted torque command 235 for determining the direct current command for operating an embodiment of the motor 40 of FIG. 1. Employing the adaptive rotor flux command process of FIG. 2 can lead to increased system efficiency while the maximum torque response is obtained by compensating for any time delay between a commanded direct current Id and generation of rotor flux to achieve an improved torque response associated with the rotor flux generation with minimized system power loss. This process of selecting the adapted predicted torque command 235 permits selecting a direct current command that yields a magnitude of flux that minimizes an increase in current without a corresponding increase in the torque. The final predicted torque command Tpf for operating an embodiment of the motor 40 of FIG. 1 responsive to the predicted torque command 208.

FIGS. 4-1 and 4-2 graphically show data associated with a rate of change in torque, which is an operating characteristic associated with a torque machine's capability to increase torque. The rate of change in torque relates to and affects the motor torque response time. FIG. 4-1 graphically shows a three-dimensional plot of data associated with an achievable rate of change in torque when starting from a steady state torque operating point, with an achievable rate of change in torque on axis (kN-m/s) 430 in relation to the present magnitude of output torque of the torque machine, shown on axis 410 and the flux in the torque machine, shown on axis 420 for one embodiment of an electrically-powered torque machine. The magnitude of flux on axis 420 corresponds to a magnitude of predicted torque command, and the magnitude of torque on axis 410 corresponds to a magnitude of the immediate torque command. As shown, a low magnitude of output torque coupled with a low magnitude of flux in the torque machine yields a low rate of change in torque. The rate of change in torque shown on axis 430 indicates a maximum rate at which the torque machine can increase delivered torque for the flux and the torque operating points. When the torque machine is generating torque (positive torque), an increase in the delivered torque means a greater amount of torque, i.e., a larger positive number. Similarly, when the torque machine is reacting torque (negative torque), an increase in the delivered torque means a greater amount of reactive torque, i.e., a larger negative number. A decrease in magnitude of torque, i.e., a decrease in the delivered torque can be achieved rapidly and is not discussed herein. The rate of change in torque depends upon the initial operating conditions. The data indicates that for a torque machine operating at a state in which the flux (or predicted torque command) is greater than the immediate torque command, the rate of change in torque, i.e., the rate at which torque can increase, is relatively high. Conversely, when the torque machine is operating at a state in which the flux is less than the immediate torque command and the immediate torque command is low, i.e., close to zero, the rate of change in torque is relatively small because increasing torque must be preceded by an increase in the flux, which introduces system latencies.

FIG. 4-2 graphically shows a two-dimensional plot of data that is derived from the data shown with reference to FIG. 4-1, including a selected magnitude of achievable rate of change in torque when starting from a steady state torque operating point, with achievable rates of change in torque 430 (i.e., 4, 6, 8, 10, 12 and 14 kN-m/s) shown in relation to the present magnitude of output torque of the torque machine, shown on axis 410 and the flux in the torque machine, shown on axis 420 for one embodiment of an electrically-powered torque machine. The selected magnitude of achievable rate of change in torque corresponds to the prescribed minimum rate of change in torque described herein, which is a magnitude of 7 kN-m/sec. This can be accomplished analytically by introducing a horizontal plane that is orthogonal to axis 430 of FIG. 4-1 at the prescribed minimum rate of change in torque of 7 kN-m/sec. As shown, the data can be employed to determine a minimum magnitude of flux in the torque machine (shown on axis 420) that is required to achieve the prescribed minimum rate of change in torque of 7 kN-m/sec in relation to the present magnitude of output torque of the torque machine (shown on axis 410). As such, a motor control routine can decide whether or not it should increase the flux level, and to what extent the flux should be increased, depending upon the present magnitude of output torque of the torque machine. When the torque machine is operating at an immediate torque of 150 Nm, then even if the response type is set to Active and the predicted command is 200 Nm, the motor control routine can determine that no increase in flux is necessary because the achievable rate of change in torque is greater than the prescribed minimum rate of change in torque for that operating point. This operation results in a power savings because the torque machine is not generating additional, unneeded flux. However, under operating condition wherein the present magnitude of output torque is 20 Nm, with an active response type and the predicted torque command and corresponding flux command set to 40 Nm, the control routine comprehends that the flux level is insufficient to achieve the prescribed minimum rate of change in torque (7 kN-m/sec), the flux level is increased to a capability for changing torque from 20 N-m to 40 N-m at a rate of at least 7 kN-m/sec.

FIG. 5 graphically shows elements associated with building a fast torque reserve for operating an embodiment of the torque machine with magnitude of torque shown in the vertical direction. Line 510 graphically shows an immediate torque command, which can be any magnitude between a negative maximum achievable torque and a positive maximum achievable torque for the torque machine. The fast torque reserve is employed by the control system to control flux in the torque machine such that the torque machine is able to achieve a change in torque associated with the fast torque reserve at the prescribed minimum rate of change in torque, e.g., at 7 kN-m/sec. One element of the fast torque reserve includes a speed control torque reserve 512, which is employed for controlling the transmission input speed during gear shifting and can be a magnitude of 20 Nm or greater than in one embodiment depending upon the shifting sequence. It is appreciated that the magnitude of the speed control torque reserve 512 can vary depending upon system configuration, system embodiment and other factors. Another element of the fast torque reserve includes transmission input speed control in transmissions that have an input member that is distinct from the transmission output. By way of example, some transmissions in electric vehicle systems have a transmission input speed that is dictated by the output speed, e.g. Ni=k*No where k is a constant. In such cases there is no transmission input speed control, but driveline damping is turned on and active. Another element of the fast torque reserve includes a driveline damping torque reserve 514, which is employed for controlling the transmission during transitions between torque generating and torque reactive modes and attendant gear lash in the transmission and driveline, and can be a magnitude of 10

Nm or greater than in one embodiment depending upon the shifting sequence. It is appreciated that the magnitude of the driveline damping torque reserve 514 can vary depending upon system configuration, system embodiment and other factors. Another element of the fast torque reserve includes engine pulse cancellation torque reserve 516, which is employed for controlling the transmission input speed during transitions between engine ON and engine OFF modes and attendant engine pulse generation that occurs during autostop and autostart modes, and can be a magnitude of 2 Nm or greater than in one embodiment. It is appreciated that the magnitude of the engine pulse cancellation torque reserve 516 can vary depending upon system configuration, system embodiment and other factors.

Figure 61:
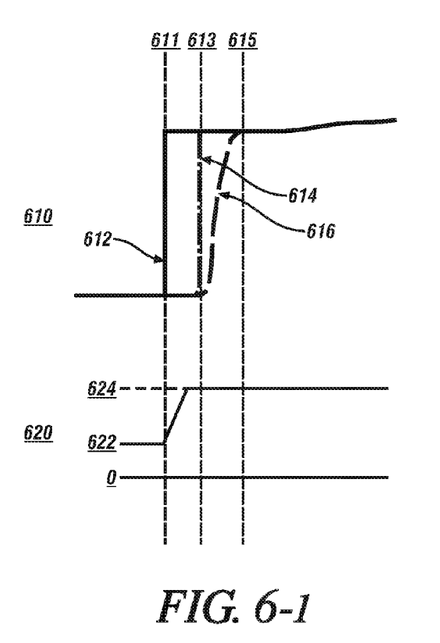

FIG. 6-1 graphically shows torque machine torque 610 and flux 620 associated with an operating point of an embodiment of a torque machine in relation to time, which is shown on the horizontal axis. The operating point of the torque machine is initially at 0 Nm, and the corresponding flux is at a flux level 622 associated with a fast torque reserve, e.g., as described with reference to FIG. 5. At time 611, a predicted torque command 612 increases to 100 Nm, indicating an imminent command to increase torque from the electric machine. The torque machine is controlled to be able to increase torque from the present or instantaneous torque, i.e., 0 Nm to the predicted torque command 100 Nm at a prescribed minimum rate of change in torque by controlling the magnitude of flux in the torque machine to the flux level 624. Thus, when an immediate torque command 614 increases to the torque command of 100 Nm at time 613, achieved motor torque 616 responds to the immediate torque command 614 at the prescribed minimum rate of change in torque, and achieves a torque output of 100 Nm at time 615.

Figure 62:
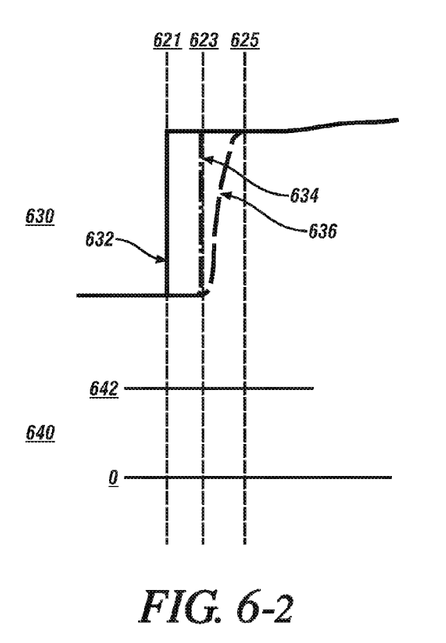

FIG. 6-2 graphically shows torque machine torque 630 and flux 640 associated with an operating point of an embodiment of a torque machine in relation to time, which is shown on the horizontal axis. The operating point of the torque machine is initially at 100 Nm, and the corresponding flux is at a flux level 642 associated with a fast torque reserve, e.g., as described with reference to FIG. 5. At time 621, a predicted torque command 632 increases to 180 Nm, indicating an imminent command to increase torque from the electric machine. In this example, the flux level 642 is sufficient to be able to increase torque from the present or instantaneous torque, i.e., 100 Nm to the predicted torque command 180 Nm at the prescribed minimum rate of change in torque without additional change in the flux. Thus, when an immediate torque command 634 increases to the torque command of 180 Nm at time 623, achieved motor torque 636 responds to the immediate torque command 634 at the prescribed minimum rate of change in torque or faster and achieves a torque output of 180 Nm at time 625.

Thus, the predicted torque command and the immediate torque command provide an improved transient response in an induction motor while minimizing power losses. At some torque levels and deltas between the predicted torque and immediate torque, additional flux above flux requirements associated with the immediate torque is commanded. At other torque levels and deltas between the predicted and immediate torques, no additional flux is commanded since the transient response requirements can be satisfied by the present flux level when the predicted torque command changes.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for controlling an electrically-powered torque machine of a powertrain system, comprising:
   determining a predicted torque command for controlling the torque machine;
   determining an immediate torque command for controlling the torque machine responsive to an output torque command to the powertrain system;
   determining a clamped torque command responsive to the immediate torque command, said clamped torque command limited to the maximum achievable torque for the electrically-powered torque machine at a monitored torque machine rotational speed and a monitored high-voltage electrical potential;
   determining an adaptive predicted torque command based on the predicted torque command and the immediate torque command;
   determining a flux command responsive to the predicted torque command, including comparing the predicted torque command with the clamped torque command and selecting the maximum of the adaptive predicted torque command and the clamped torque command as a flux torque command and determining the flux command based on the flux torque command, said flux command comprising a flux level providing a fast torque reserve that is responsive to the predicted torque command, the fast torque reserve comprising a prescribed minimum rate of change in torque output from the torque machine responsive to the predicted torque command; and
   operating an inverter controller to control flux of the torque machine responsive to the flux command.

2. The method of claim 1, wherein determining the predicted torque command comprises determining a commanded motor torque that may occur in a near-term.

3. The method of claim 2, wherein determining the commanded motor torque that may occur in the near-term comprises determining a commanded motor torque that may occur within 200 microseconds.

4. The method of claim 2, wherein determining the commanded motor torque that may occur in the near-term comprises determining a projected change in the commanded motor torque responsive to engine pulse cancellation associated with an autostop operation and an autostart operation for an internal combustion engine of the powertrain system.

5. The method of claim 2, wherein determining the commanded motor torque that may occur in the near-term comprises determining a projected change in the commanded motor torque responsive to damping related to gear lash in a driveline coupled to the powertrain system.

6. The method of claim 2, wherein determining the commanded motor torque that may occur in the near-term comprises determining a projected change in the commanded motor torque responsive to transmission input speed control during gear shifting in a transmission of the powertrain system.

7. The method of claim 1, wherein determining the predicted torque command comprises determining a magnitude of torque the torque machine shall be able to produce within a specified time period.

8. The method of claim 1 wherein said immediate torque command comprises a command for motor torque that shall be produced by the torque machine as quickly as it can be produced.

9. The method of claim 1, wherein determining the flux command comprising the flux level providing the fast torque reserve that is responsive to the predicted torque command comprises determining a minimum flux that can achieve at least the prescribed minimum rate of change in torque output from the torque machine that is responsive to the predicted torque command.

10. The method of claim 9, wherein the minimum rate of change in torque output from the torque machine comprises a minimum rate of change in torque of 10 kN-m/sec.

11. A method for controlling a powertrain system including an electrically-powered torque machine and an internal combustion engine coupled to a transmission configured to transfer torque to a driveline, comprising:
   determining a predicted torque command and an immediate torque command for controlling the torque machine;
   determining a clamped torque command responsive to the immediate torque command, said clamped torque command limited to the maximum achievable torque for the electrically-powered torque machine at a monitored torque machine rotational speed and a monitored high-voltage electrical potential;
   determining an adaptive predicted torque command based on the predicted torque command and the immediate torque command;
   determining a flux command responsive to the predicted torque command, including comparing the predicted torque command with the clamped torque command and selecting the maximum of the adaptive predicted torque command and the clamped torque command as a flux torque command and determining the flux command based on the flux torque command, said flux command comprising a flux level providing a fast torque reserve that is responsive to the predicted torque command, the fast torque reserve comprising at least a prescribed minimum allowable rate of change in torque output from the torque machine responsive to the predicted torque command;
   operating an inverter controller to control flux of the torque machine responsive to the flux command and control torque output from the torque machine responsive to the immediate torque command.

12. The method of claim 11, wherein determining the predicted torque command comprises determining a commanded motor torque that may occur in a near-term.

13. The method of claim 12, wherein determining the commanded motor torque that may occur in the near-term comprises determining a commanded motor torque that may occur within 200 microseconds.

14. The method of claim 12, wherein determining the commanded motor torque that may occur in the near-term comprises determining a projected change in the commanded motor torque responsive to engine pulse cancellation associated with an autostop operation and an autostart operation for the internal combustion engine.

15. The method of claim 12, wherein determining the commanded motor torque that may occur in the near-term comprises determining a projected change in the commanded motor torque responsive to damping related to gear lash in the driveline.

16. The method of claim 12, wherein determining the commanded motor torque that may occur in the near-term comprises determining a projected change in the commanded motor torque responsive to transmission input speed control during gear shifting in the transmission.

17. The method of claim 11, wherein determining the predicted torque command comprises determining a magnitude of torque the torque machine shall be able to produce within a specified time period.

18. The method of claim 11, wherein determining the flux command comprising the flux level providing the fast torque reserve that is responsive to the predicted torque command comprises determining a minimum flux that can achieve at least the prescribed minimum rate of change in torque output from the torque machine that is responsive to the predicted torque command.

* * * * *